July 10, 1962  LE ROY E. JOHNSON ETAL  3,043,176
INTERRELATED TOOL AND WORK CONVEYER
DRIVES FOR A DISC PUNCH
Filed May 23, 1957  5 Sheets-Sheet 2 fig. 2 fig. 4

INVENTORS
LEROY E. JOHNSON
CHESTER C. SPERRY
BY
*Robert E. Wanshaw*
ATTORNEY fig. 3 fig. 5 fig. 6 fig. 7

INVENTORS
LEROY E. JOHNSON
CHESTER C. SPERRY
BY
ATTORNEY fig. 8 fig. 9

INVENTORS
LEROY E. JOHNSON
CHESTER C. SPERRY
BY
ATTORNEY ns 3,043,176
Patented July 10, 1962

3,043,176
INTERRELATED TOOL AND WORK CONVEYER DRIVES FOR A DISC PUNCH
Le Roy E. Johnson and Chester C. Sperry, Kalamazoo, Mich., assignors to The Upjohn Company, Kalamazoo, Mich., a corporation of Michigan
Filed May 23, 1957, Ser. No. 661,227
10 Claims. (Cl. 83—109)

This invention relates to an apparatus which is useful in a process for determining the potency of liquid media, particularly the fermentation products of micro-organisms, and it particularly relates to an apparatus which is useful in a process for determining the potency of a large number of samples of such media. This application relates to the subject matter of Patent No. 2,771,399, issued November 20, 1956, and represents an improvement in apparatus for performing the process disclosed therein.

The above application relates to a process, and apparatus for carrying out the process, for assaying fermentation products, such as antibiotic substances, to determine their ability to affect the growth of a test organism, such as an organism pathogenic to man. Prior to the discovery disclosed in the aforementioned patent it had been suggested to test antibiotic substances by impregnating an absorbent disk with the antibiotic and then applying the disk to an agar layer which had been seeded with the test organism. This prior process was undesirable because it required the use of individual disks which materially increased the amount of hand labor involved in testing a large number of antibiotics and also because of the difficulty of keeping accurate data when testing a large number of samples. According to one preferred process described in the patent above referred to, the liquid fermentation products of a variety of micro-organisms are held within separate flasks. A single sheet of absorbent material is placed over the mouths of all of the flasks and then all of the flasks are simultaneously inverted to deposit a quantity of the liquid fermentation products therewithin onto the absorbent sheet. The sheet has a number of circles printed thereon and the mouths of the flasks are positioned within the respective circles. The circles are intended to limit the spread of the liquid fermentation product and confine same as much as possible to the region within said circles. The sheet, with a large number of spots of liquid fermentation products thereon, is then placed on top of an agar layer which has previously been seeded with a test organism. The sheet is allowed to remain in contact with the agar layer for a predetermined period, e.g., 20 minutes, to permit the fermentation products to diffuse into the agar layer and it is then removed. The agar layer is then subjected to conditions favorable to the growth of the test organism, and after a predetermined period of time, the agar layer is inspected to see if the fermentation products have inhibited the growth of the test organisms.

While the aforementioned process has been found to be suitable in most respects and permits much more rapid testing of the fermentation products than was previously possible, it has been found that the results obtained by use of this process do not provide all of the information which is desired, and which appears available, from a test of this type. In particular, it has been observed that this process, even at best, does not give other than approximate quantitative results but provides only qualitative results. This appears to be due to the fact that the amounts of fermentation products deposited on the absorbent sheet in the various regions or circles thereon are often unequal.

The mycelium of certain fermentation products interfere with the free passage of the fermentation product to the absorbent sheet, and also limit the spread of such product through the sheet. Where a number of fermentation products are to be tested on the same sheet, and said products have different mycelium characteristics, it is apparent that the amount of fermentation product deposited on the sheet will vary for the respective types of products. Since the volume of fermentation products absorbed by the sheet and then deposited upon the agar layer has a significant effect on the amount of growth inhibition, it is apparent that the variations in the amount of fermentation products placed on any given sheet will often adversely affect the precision of the assay method and will in such cases render the experimental results not usable for quantitative purposes.

Further, in the process disclosed in the aforementioned patent wherein the absorbent sheet was removed from the agar layer after a predetermined period of time, but before the seeded agar layer was subjected to growth-promoting conditions, it is apparent that less than the full amount of the fermentation product in the sheet was deposited on the agar layer and, therefore, the amount of growth inhibition was materially less than would have occurred if the full quantity of fermentation product were applied to the agar layer. Thus, in some instances, the test results of the prior process would indicate that the fermentation product was ineffective as a growth-inhibiting agent, while the actual fact was that this fermentation product had a real, though perhaps small, growth-inhibiting characteristic when tested under more precise conditions.

Further, the prior process requires the manual removal of the absorbent sheet from the agar layer. Thus, when the agar layer is seeded with an organism pathogenic to man, this sometimes results in contact of the operator with the test organism, which is undesirable from a personnel standpoint.

Therefore, it is a principal object of this invention to provide an improved apparatus which is useful in a process for investigating the growth-affecting potency of a variety of fermentation products of micro-organisms.

It is a further object of this invention to provide an apparatus, as aforesaid, which is useful in performing a process wherein samples of the fermentation products are deposited onto an absorbent transfer sheet, and wherein portions of the absorbent sheet containing substantially the same amounts of fermented materials will be separated from the remainder of said absorbent sheet and deposited in a predetermined pattern upon an agar layer, said layer having been seeded with a test organism.

It is a further object of this invention to provide a machine for separating areas of an absorbent sheet from each other and from the remainder of the sheet, and for depositing said areas onto an agar layer.

It is a further object of this invention to provide a machine, as aforesaid, for sequentially punching separate areas from an absorbent sheet and depositing same in a predetermined pattern on said agar layer.

It is a further object of this invention to provide a machine, as aforesaid, including a punch, and a conveyor mechanism for moving an absorbent sheet and an agar layer beneath the punch, wherein said punch and said conveyor may be operated in synchronism to deposit punched areas of an absorbent sheet in a predetermined pattern upon said agar layer.

TERMINOLOGY

The terminology employed throughout this specification will be the same as that set forth in the above mentioned patent.

The term "micro-organisms" will be used throughout to denote the source of the material being investigated for growth-inhibiting or growth-stimulating effects. The term "test organism" will be used to denote the various kinds of organisms whose growth is to be stimulated or inhibited by substances secreted by the micro-organisms above mentioned. The term "beer" will be used to denote the fermented substrate containing both micro-organisms and antibiotic material or other fermentation products of the micro-organisms. The means upon which the test organism is permitted to grow will be frequently termed an "agar tray," since that is what it will usually be. However, the term will also refer, unless otherwise restricted, to any other convenient culture medium which may be desired.

PROCESS

In accordance with the process in which apparatus of the invention may be used, the respective types of micro-organisms being investigated are placed into separate flasks, said flasks having a liquid substrate therewithin, which substrate is usually of any kind desired for the production of antibiotics. This will be true whether the micro-organism or whether the subtrate is in a particular instance the object of the test. The flasks are subjected to conditions for causing growth of the micro-organisms, which conditions will normally be well known in a given instance and need no detailing. At the end of the fermentation period, the containers are placed on a common support and a sheet of absorbent material, e.g., ordinary filter paper, is placed over the top of each of the flasks. The flasks are then inverted for a period of time to cause the beer to pass onto, and be absorbed by, the absorbent sheet. The sheet absorbs an amount of the beer from each of the flasks, each of said beers being located in separate regions on the sheet. While it is possible that the respective regions have unequal amounts of beer therein, ordinarily the central portions of each region, the central portions including the areas which overlie the mouths of the flasks, will contain substantially equal amounts of beer.

The sheet is then placed in an apparatus for punching out portions thereof, ordinarily the central portions as described above. Portions of the sheet are punched out and deposited onto an agar layer previously seeded with a test organism. In the apparatus disclosed in this application, the punching operation consists of a series of repeated punchings of successive portions of the absorbent sheet, together with the simultaneous movement of a carriage which supports the agar layer, said layer being supported beneath the punches, whereby the punched out portions of the absorbent sheet are free to fall by gravity, or may be actually impelled by the rapid downward motion of the punch, onto the agar layer and are arranged thereon in predetermined fashion.

The apparatus for carrying out the fermentation process for the micro-organisms, as well as the apparatus for inverting the flasks to deposit the beer on the absorbent paper, and, also, the structure of the agar tray, may all be the same as that disclosed in the patent referred to hereinabove. However, it is apparent that other equipment known to those acquainted with this industry can be used to carry out the process steps referred to above. The punching apparatus comprising the present invention now will be described.

APPARATUS

Figure 1:
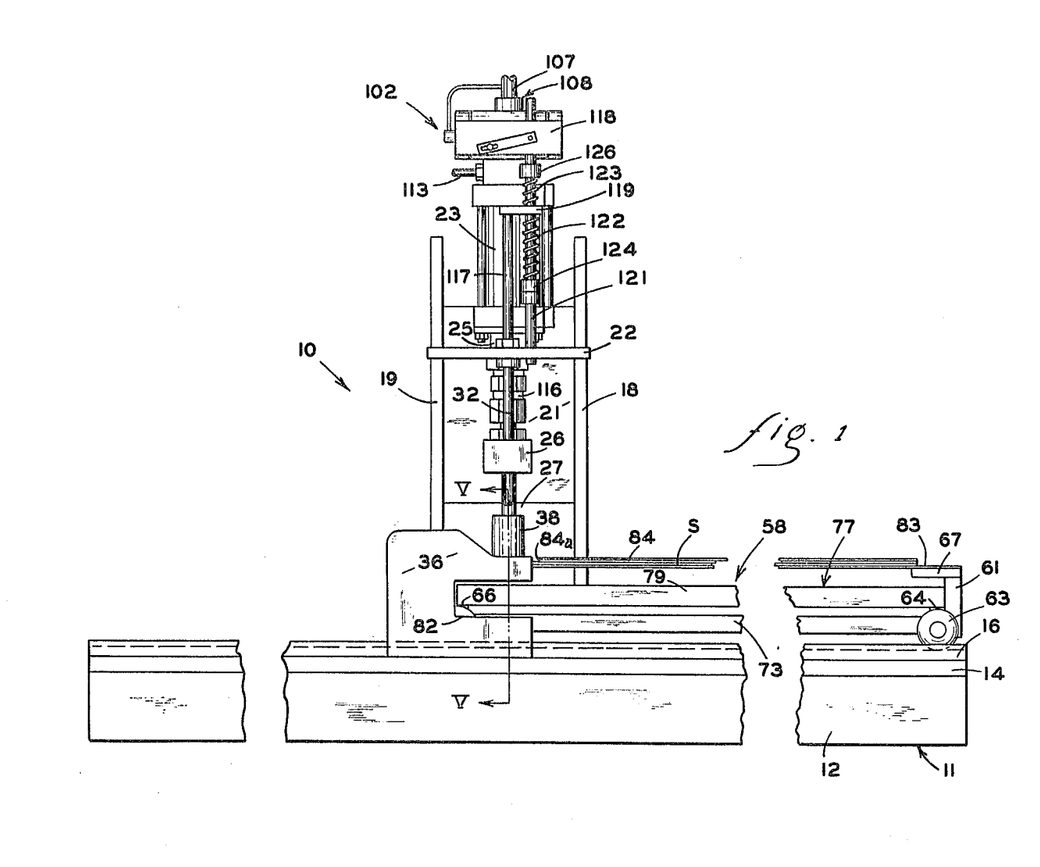
FIGURE 1 is a front elevational view of the punching machine.
Figure 2:
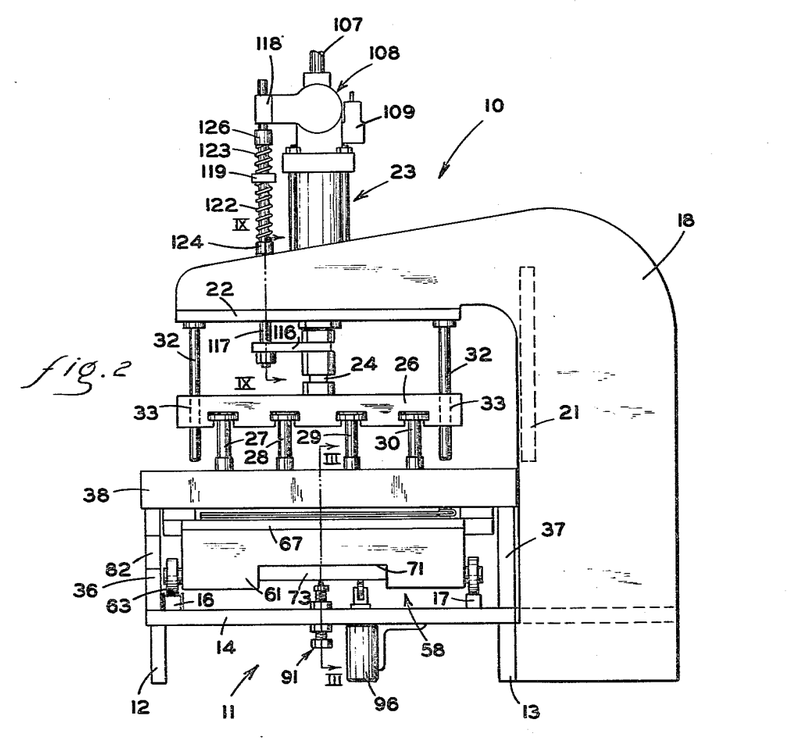
FIGURE 2 is a side elevational view of the punching machine taken from the rightward side thereof as appearing in FIGURE 1.
Figure 5:
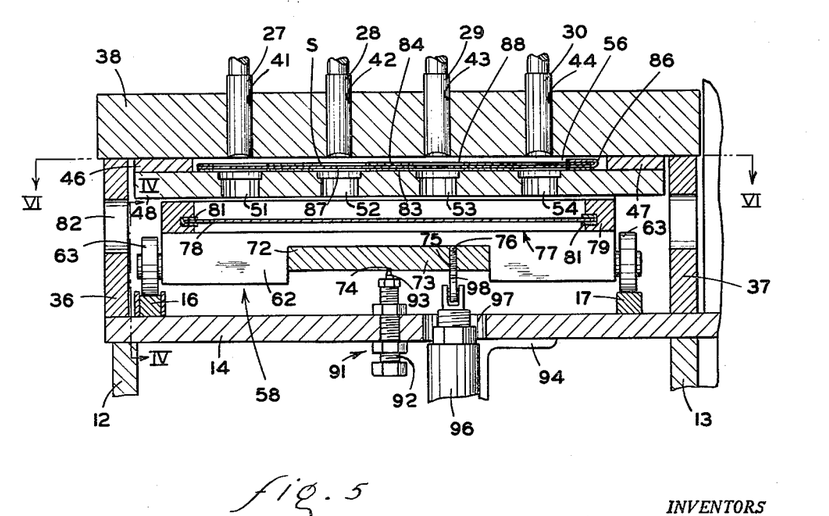
FIGURE 5 is a sectional view taken along the line V—V of FIGURE 1.

The machine 10 for effecting the punching operation includes a frame 11 (FIGURE 1), having a pair of vertical support legs 12 and 13 (FIGURES 2 and 5). A plate 14 extends between and is secured to the legs 12 and 13. A pair of tracks 16 and 17 are positioned on the upper surface of plate 14. A pair of spaced overhanging arms 18 and 19 are secured to leg 13, each arm including a portion extending vertically from said leg and a portion extending horizontally, said horizontal portion being substantially parallel with and spaced upwardly from plate 14. Arms 18 and 19 are connected together by means of a vertical plate 21 and a horizontal plate 22, said vertical and horizontal plates extending between and being secured to the vertical and horizontal portions of said arms, respectively.

A cylinder 23 is supported by a block 25 (FIGURE 9) on horizontal plate 22. A piston is slidably positioned within said cylinder and is connected to a rod 24 (FIGURE 2) which extends vertically through openings in said block 25 and plate 22. A horizontal cross head or bar 26 is connected to the lower end of piston rod 24 for upward and downward movement therewith. The horizontal bar 26 supports a plurality, here four, of vertically disposed, laterally spaced punches 27, 28, 29 and 30. The punches have end faces of any conventional design which are adapted to cut through the absorbent sheets (FIGURE 5). A pair of guide rods 32 (FIGURE 2) are secured to horizontal plate 22 adjacent the opposite ends thereof and extend downwardly therefrom. Co-operating openings 33 are provided in the horizontal bar 26 for receiving said guide rods therethrough, said guide rods serving to guide the movement of horizontal bar 26 and punches 27, 28, 29 and 30 and to limit same to movement in a vertical direction.

A pair of mounting brackets 36 and 37 (FIGURES 1, 2 and 3) are secured to the horizontal plate 14 adjacent the front and rear edges thereof and extend upwardly therefrom. The brackets 36 and 37 support a block 38 (FIGURE 5), said block having a series of openings 41, 42, 43 and 44 therethrough for receiving the punches 27, 28, 29 and 30, respectively. A pair of spacers 46 and 47 are secured to the lower surface of block 38 adjacent the respective ends thereof. A disk guide plate 48 extends between, and is secured to, the lower surfaces of the spacers and has openings 51, 52, 53 and 54 for receiving the punches and the punched disks therethrough. The spacers 46 and 47, plate 48 and block 38 define a passageway 56 for receiving the absorbent sheet "S" and the structure associated therewith, as described in greater detail hereinbelow.

A carriage 58 (FIGURE 2) rides on tracks 16 and 17. The carriage 58 includes a pair of end members 61 and 62 (FIGURE 4), each of said end members supporting a pair of rollers 63 at either side thereof, said rollers riding on tracks 16 and 17. The end members 61 and 62 are formed with offset shoulders 64 and 66 (FIGURE 3) for purposes which will become apparent hereinafter. A pair of plates 67 and 68 are secured to the top of end members 61 and 62, and extend toward each other longitudinally of the carriage. The end members 61 and 62 have notches 71 and 72 (FIGURES 2, 3 and 5) formed in the lower edge thereof. A plate 73 (FIGURES 3 and 4) is secured to, and extends between, the end members 61 and 62, and lies within the notches 71 and 72. The plate 73 has a row of spaced, substantially semi-circular recesses 74 (FIGURE 3) in the lower surface thereof. Said recesses 74 are aligned longitudinally of each other, and are spaced from each other a suitable distance as described in greater detail hereinafter. A row of openings 76 (FIGURE 5) are provided in plate 73, said openings being aligned with the recesses 74 and being spaced laterally therefrom.

A tray 77 (FIGURES 3 and 4) for the agar layer is supported on shoulders 64 and 66 of carriage 58. As best shown in FIGURE 5, the tray 77 includes a flat base 78, which may desirably be formed of glass, and which is held within a metallic, desirably aluminum, retaining frame 79. The glass base 78 is sealed in grooves in the side of the frame 79 by a sealing gasket 81 formed of rubber or other pliable and resilient material. The tray 77 is placed on the carriage 58 by moving the carriage to its extreme rightward position, as appearing in FIGURES 1 and 3, and then sliding the tray rearwardly of the machine 10 onto shoulders 64 and 66. Bracket 36 is provided with a notch 82 (FIGURE 1) for permitting such movement of the tray.

A panel 83 (FIGURE 4) is secured to carriage 58 and is positioned on, and extends between, the plates 67 and 68. The lower surface of panel 83 slides upon the top surface of plate 48 (FIGURES 3 and 5) and has a series of openings 87 therethrough. A clamp plate 84 having openings 88 therethrough is connected to panel 83 by means of a hinge 86. The clamp plate 84 (FIGURES 1, 3, 4 and 6) is shorter lengthwise of the carriage 10 than the panel 83 and the absorbent sheet S by an amount permitting the plate 84 to be pivoted upwardly away from the panel 83 when said carriage 10 is in its full rightward position (FIGURES 1 and 5) without interference from the block 38. The engagement between the plate 48 and the plate 68 (FIGURE 3) limits the rightward movement of the carriage 58. In this embodiment, the left edge of panel 83 appears at 83a and the left edge of plate 84 appears at 84a in FIGURE 6.

The openings 87 and 88 are arranged in longitudinally and laterally extending rows, in this particular embodiment being aligned in four longitudinally extending rows. Each row in panel 83 includes a number, e.g., ten, of said openings 87 and clamp plate 84 has one less, e.g., nine, of said openings 88 in each row due to its shorter length. Openings 87 and 88 are all of the same size and are in alignment, respectively, with respect to each other, excepting for the extreme leftward group of openings 87 which have no counterparts in panel 84. Thus, in the initial punching operation the punches will pass through the sheet S and through the first openings 87 in each row. In subsequent punching operations, the punches will pass through respective pairs of aligned openings 87 and 88. The panel 83, clamp plate 84 and hinge 86 are received within the passage 56 defined by block 38, spacers 46 and 47 and plate 48. The absorbent sheet S is adapted to be received between the panel 83 and clamp plate 84 and extends from the rightward edges of panel 83 and plate 84, as appearing in FIGURE 6, to a position beyond and overlying the first openings 87 in each row. The sheet is positioned between the panel and plate by moving the carriage to its extreme rightward position, as appearing in FIGURES 1 and 3, raising the clamp plate 84, and inserting the sheet manually. The clamp plate 84 is then pivoted downwardly to a position on top of said sheet.

A detent mechanism 91 (FIGURES 3 and 5) is secured to plate 14, directly below the punches 27, 28, 29 and 30. The detent mechanism includes a threaded rod 92, which extends through plate 14 and is locked in position thereon. A ball 93 is mounted on the upper end of rod 92 and is adapted to seat in the recesses 74 in plate 73. Thus, as the carriage is moved leftwardly, as appearing in FIGURES 1 and 3, the ball 93 will seat within successive recesses 74.

A bracket 94 (FIGURE 5) is secured to plate 14 directly beneath the punches. A micro-switch 96 is supported by said bracket 94 and has a switch actuator 98 which extends vertically through an opening 97 in said plate 14. The switch actuator 98 is adapted to engage successively the pins 75 disposed in, and extending downwardly from, the openings 76 as the carriage 58 is reciprocated. The switch actuator 98 is ordinarily held in one position by contact with the lower surface of plate 73. However, when the switch actuator 98 is depressed by contact with a pin 75, the switch 96 is moved to its other position.

The punches 27, 28, 29 and 30 (FIGURE 2) are adapted to be moved vertically as a group by the head 26 in response to movement of the piston within the cylinder 23, which piston in turn moves in response to actuation of the micro-switch 96 as above described. While many different kinds of specific mechanisms may be employed for vertically reciprocating the cross head 26, a brief description of one suitable apparatus for this purpose will be given herein for the purpose of completeness in disclosure.

Figures 8, 9:
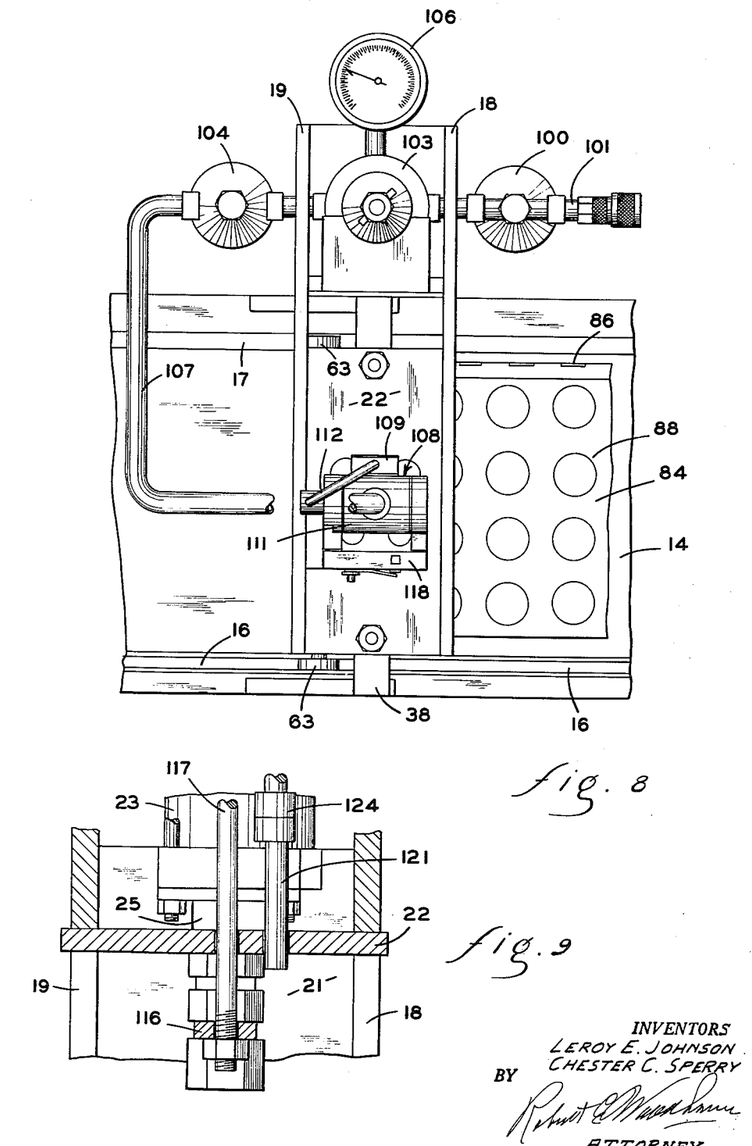
FIGURE 8 is a fragmentary, top plan view of the punching machine including a representation of the means supplying pressure fluid.
FIGURE 9 is a sectional view taken along the line IX—IX of FIGURE 2.

Referring first to FIGURE 8, a supply line 101 is provided for pressure fluid, which for illustrative purposes herein may be considered to be compressed air. Said air will normally be conveyed to a suitable filter 100 thence to a pressure regulator 103 and finally to a suitable lubricating device 104 wherein droplets of oil will be introduced into the air stream for the purpose of lubricating the cylinder 23 and piston contained therein in the usuall manner. A pressure gauge 106 will normally be associated with the regulator 103.

A conduit 107 extends from the lubricator 104 and enters into the upper end of the valve mechanism 108. A suitable solenoid 109 moves in response to energization of micro-switch 96 to control the passage of air from the conduit 107 into the valve mechanism 108 and the exhaust of air from said mechanism. This valve mechanism may be of any conventional arrangement, of which many are well known, and hence needs no detailing here. However, one desirable embodiment will utilize a pilot valve within the valve body 111 which pilot valve is supplied by the conduit 112 extending thereto from the solenoid 109 for operating the main valve which is also located within the body 111. The pilot valve is such that it may be shifted to one position upon energization of solenoid 109 and may be returned to its original position by suitable mechanical actuation. The exhaust from said cylinder 23 is conducted by the valve mechanism 108 through the conduit 113 (FIGURE 1) to any suitable exhaust receiving device.

A plate 116 (FIGURES 1, 2 and 9) is fixed immovably with respect to the rod 24 and extends rearwardly therefrom. The plate 116 supports at its front end a rod 117 which extends upwardly therefrom. A rod 121 is parallel with rod 117 and extends at its upper end into the portion 118 of the valve structure 102 and at its lower end extends slidably through plate 22. A collar 119 embraces said rod 121 for sliding movement thereon, said collar 119 being affixed to the upper end of rod 117. The spiral springs 122 and 123 encircle the rod 121 between said collar and the stops 124 and 126, respectively, on said rod 121 for cushioning the action of said stops against said collar. The relationship of the upper end of said rod 121 to the portion of the pilot valve indicated at 118 is such that, as the piston rod 24 moves downwardly, the collar 119 is drawn toward the stop 124, thereby compressing the spring 122. At a predetermined position of the piston near the lower end of its stroke, rod 117, acting through the stop 124, shifts the rod 121 downwardly to reverse the pilot valve whereby to actuate the main valve in a manner to introduce pressure fluid to the lower end of the cylinder 23 and thereby return it rapidly into its uppermost position. As said cylinder moves upwardly, and the collar 119 approaches the stop 126 and compresses the spring 123, the rod 121 thereby being shifted upwardly at a predetermined time. The pilot valve is thus reset for actuating the main valve to direct pressure fluid into the upper end of the cylinder 23 upon further actuation of the solenoid 109.

Turning now to the electric circuitry (FIGURE 7), it is desired to operate the valves in such a manner that the cylinder will effect only a single downward and upward operation of the piston rod 24 in response to any one actuation of the micro-switch 96, even though the tray is left in such position that the micro-switch 96 is held closed for a period of time longer than that required to produce a single operating cycle of the cylinder 23.

Figure 7:
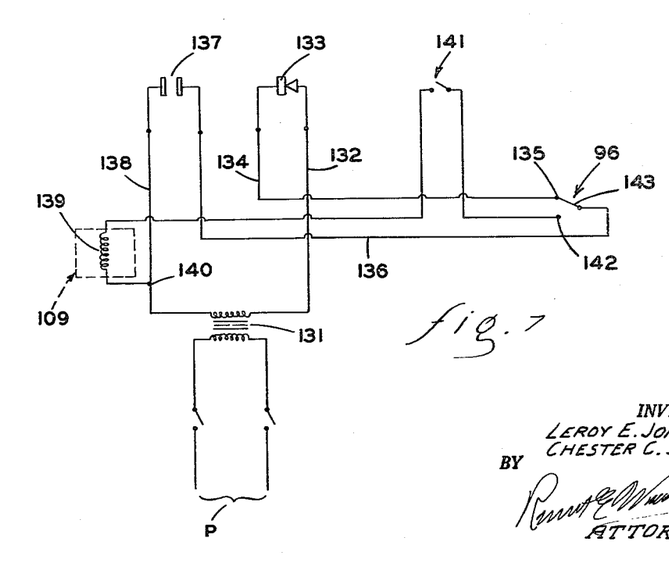
FIGURE 7 is a diagram of the control circuit.

For this purpose, there is provided a source of potential "P" energizing the primary winding of a transformer 141 through a pair of conventional switches. The secondary winding of said transformer is connected through a conductor 132 to a rectifier 133 and thence through a conductor 134 to a pole 135 of the switch 96. The other pole 142 of said switch 96 is connected through a switch 141, which may be manually operated, to the winding 139 of solenoid 109 and thence through the junction point 140 to the opposite end of said secondary winding. The armature 143 of said switch 96 is connected through a conductor 136 to one side of a capacitor 137 and the other side of said capacitor is connected through the conductor 138 to said second side of the secondary winding of the transformer 131. The operation of this mechanism will appear hereinafter.

OPERATION

Figure 6:
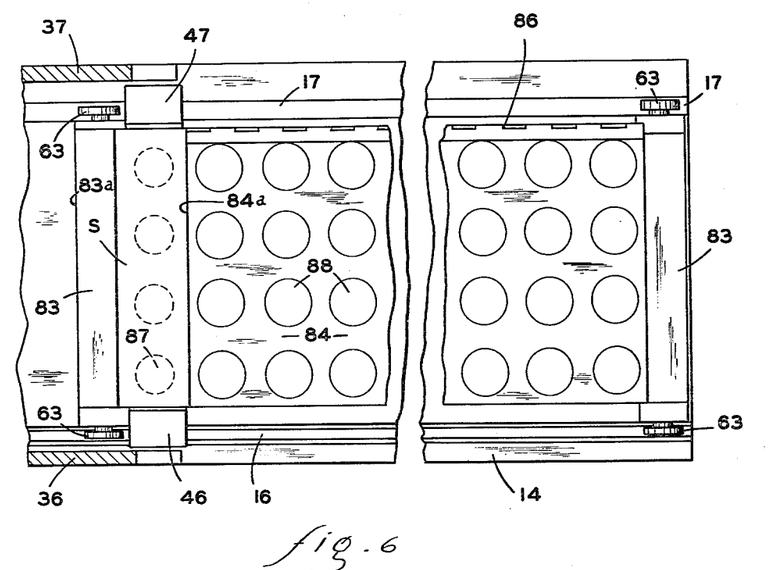
FIGURE 6 is a sectional view substantially as taken along the line VI—VI of FIGURE 5 and rotated 90° counterclockwise.

A plurality, e.g., forty, of containers, having a suitable substrate therein, are inoculated with the microorganisms to be investigated. The containers are then placed under such conditions of temperature and humidity as to promote the growth of the micro-organisms in the several containers, and the containers are subjected to such other treatment, such as moderate agitation, in accordance with known practice, to promote such growth. After the micro-organisms have fermented the substrate, the containers are arranged on a suitable support and a sheet of sterile, absorbent material, such as ordinary filter paper, is placed over the mouths of the containers. The sheet and containers are arranged so that the areas of the sheet to be impregnated lie in the same pattern and spacing as openings 87 and 88 (FIGURE 6). The containers are then simultaneously inverted so that the beer therewithin is deposited upon the filter paper. The flasks are held in their inverted position for a short period of time until the desired quantity of beer has been absorbed by the sheet and then returned to their upright position. Ordinarily, the sheet is manipulated so that it does not absorb an excess of beer but only absorbs enough beer that the various areas thereof do not run together, but remain substantially separated from each other. The sheet may, if desired, be dried in any suitable fashion, care being taken that the drying operation does not adversely affect the antibiotic component of the beer. This sheet is then placed between the panel 83 and plate 84, with the areas of the sheet which are impregnated with the beer, except in the first row, being between and in alignment with the openings 87 and 88. The first row of said impregnated areas is above the extra row of openings 87 in panel 83. The armature 143 of switch 96 will be held in contact with terminal 135 due to engagement of the switch actuator 98 with the plate 73. Capacitor 137 will be charged through switch 96 and rectifier 133.

In the meantime, an agar layer previously seeded with a suitable test organism has been prepared on the base 78 of tray 77. The tray 77 is placed on the carriage 58 and will be aligned with the sheet S. The detent mechanism 91 will seat in the first of the recesses 74 in plate 73 and the switch actuator 98 of micro-switch 96 will be depressed by the first pin. Thus, the armature 143 of switch 96 will be moved to a position of engagement with pole 142. With the carriage positioned in this fashion, and as soon as the operator actuates switch 141, as by operating a foot-switch, to close the circuit between the coil 139 and switch 96, the capacitor 137 will discharge through the coil 139. This will actuate solenoid 109 and thereby cause the valve 108 (FIGURE 8) to be actuated to direct fluid into the cylinder 23 and thereby force the piston 24 and punches 27, 28, 29 and 30 downwardly. The punches will pass through the openings 88 and will punch out the first row of impregnated areas of the sheet S, said portions then dropping onto the agar layer. The punches are of such size, and the areas of impregnation of the sheet S with the beer are such, that the punches do not punch out the entirety of the impregnated areas, but punch out only the central portions thereof, said central portions being the most likely to have a substantially uniform amount of the beer therein.

Figure 3:
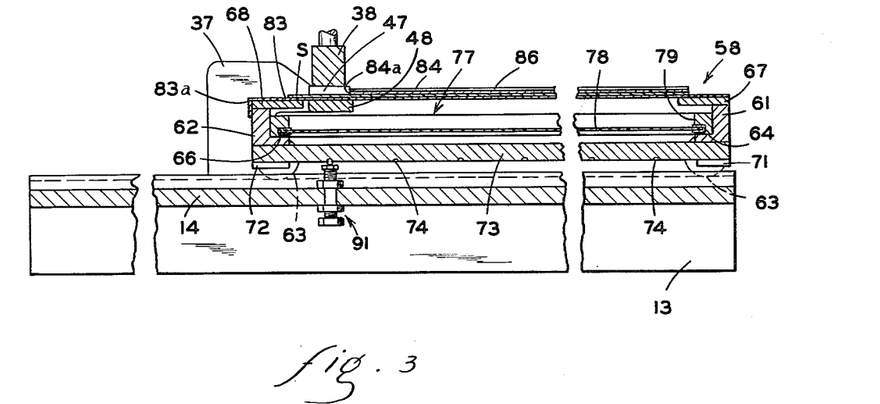
FIGURE 3 is a sectional view taken along the line III—III of FIGURE 2.
Figure 4:
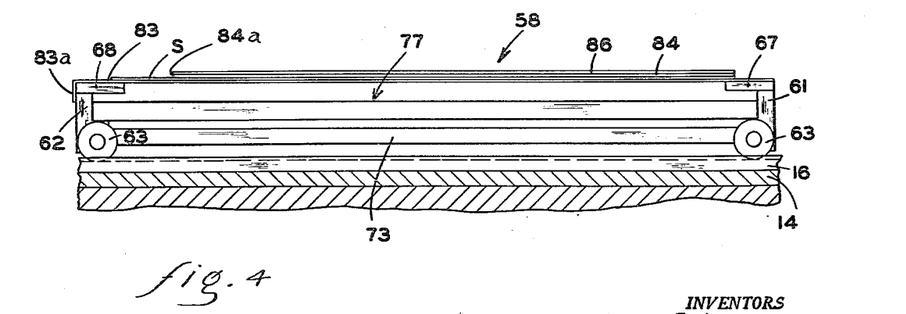
FIGURE 4 is a sectional view taken along the line IV—IV of FIGURE 5 and showing one side of the carriage.

The carriage 58 is then moved leftwardly, as appearing in FIGURES 1 and 3, to the next position where the ball 93 of the detent mechanism seats within the second of the recesses 74. During such movement, the actuator 98 of the micro-switch 96 is positioned against the plate 73 so that the armature 143 is connected to the contact 135 which causes capacitor 137 to be charged. When the carriage reaches its next position, the micro-switch 96 will be actuated by another pin 75 to bring the armature 143 in engagement with the contact 142, thereby readying the circuit for the next punching operation. As soon as the operator actuates switch 141, the punches will be actuated to cause a further punching operation. In the second and succeeding punching operations, the punches will pass through the aligned openings 87 and 88. This sequence of operation will be continued until all of the areas containing the fermented substance have been punched out and deposited on the agar layer.

The tray 77 is then removed from the punching machine and is placed under conditions suitable for promoting the growth of the test organisms in the agar. After the elapsing of a selected period of time, the tray 77 is visually examined and the zones of inhibition of growth of the test organisms are noted.

EXAMPLE

A group of forty actinomycete cultures were seeded separately into forty flasks, said flasks containing a liquid substrate known to be suitable for the production of antibiotics. The flasks were then covered with sterile material and were subjected to known treatment for effecting fermentation. At the end of the fermentation period, the flasks were arranged in order and a sheet of sterile filter paper was placed over the mouths of all of the flasks and the flasks were inverted for a period of approximately five seconds, during which a volume of the beer from each flask was deposited on, and absorbed by, the sheet. The sheet was subsequently dried. The foregoing steps were performed using the apparatus and following the procedures set forth in the aforementioned patent.

The sheet was then transferred to the punch apparatus 10 disclosed herein with the areas of the sheet impregnated with the beer being in alignment with the openings 87 and 88. A tray having an agar layer therein was placed on the carriage 58 of the punch apparatus, the agar layer having previously been seeded with a measured population of *Klebsiella pneumoniae*, which is a bacterium pathogenic to man. The punch apparatus was then actuated in the manner previously described and forty disks, each disk being ½ inch (12.7 mm.) in diameter, were deposited in a predetermined pattern on the agar layer. About 1–2 minutes were required to punch out all samples from the sheet. The agar tray with the disks thereon was incubated overnight under conventional conditions. Following incubation, it was observed that certain of the area of the agar in contact with certain of the disks showed inhibition of the growth of *Klebsiella pneumoniae*, thus indicating the presence of an antibiotic active against *Klebsiella pneumoniae*.

Further tests using different test organisms, beers from other microorganisms, or using different substrates or different culturing conditions provided information indicating the importance of these various factors.

Repeated tests using the same conditions as prevailed above gave good correlation in the size of the respective zones of inhibition.

As pointed out in the aforementioned patent, it is not necessary that the disks be applied to the agar after seeding of the test organism since it is possible, though not ordinarily desirable, to apply the disks to the agar before seeding. Further, it is apparent that the liquid substrate may be of any desired fluid type. Likewise, any suitable culture medium may be used in place of the agar layer.

Although the above mentioned drawings and description refer to one particular, preferred embodiment of the invention, it is not our intention, implied or otherwise, to eliminate other modifications or variations of the invention unless specifically stated to the contrary in the hereinafter appended claims.

We claim:

1. A machine for punching out areas of a sheet and depositing same in a predetermined pattern on a tray, including in combination: a series of vertically movable punches; actuating means for moving said punches through a punching stroke; a carriage positioned below said punches, said carriage being movable in a horizontal direction beneath said punches; means on said carriage for supporting a sheet so that said sheet moves with said carriage in a horizontal plane beneath said punches; means on said carriage for supporting a tray beneath said sheet so that said tray moves with said carriage and thereby moves simultaneously with said sheet and whereby areas of said sheet may be punched out and fall in a predetermined pattern on said tray; a switch actuated by the positioning of said carriage in a predetermined location with respect to said punches, said switch being connected for effecting operation of said actuating means.

2. A machine for punching out areas of a sheet and depositing same in a predetermined pattern on a tray, including in combination: a series of vertically movable punches; actuating means for moving said punches through a punching stroke; a carriage positioned below said punches, said carriage being movable in a horizontal direction beneath said punches; means including a pair of pivotally connected plates horizontally disposed on said carriage for movement therewith, said plates having a series of aligned openings therethrough, said openings being alignable with said punches, said plates being adapted to receive a sheet therebetween; a tray positioned on said carriage beneath said plates and movable with said carriage and said plates; means defining an unobstructed path between said tray and said plates whereby portions punched out of said sheet may fall freely onto said tray; switch actuating means on said carriage at spaced locations thereon corresponding to the desired spacing between successive portions to be punched out of said sheet; a switch positioned adjacent said carriage for actuation by said switch actuating means, said switch being connected to said first mentioned actuating means for at least partly controlling the operation thereof whereby said punches are moved through a punching stroke each time said switch is actuated by said switch actuating means.

3. A machine for punching out areas of a sheet and depositing same in a predetermined pattern on a tray, including in combination: punch means positioned for vertically downward punching operation; actuating means for moving said punch means through a punching stroke; a carriage positioned below said punch means, said carriage being movable underneath said punch means in a horizontal direction; means on said carriage for supporting a sheet and for moving said sheet with said carriage in a horizontal plane beneath said punch means; means on said carriage for supporting a tray beneath said sheet and for moving said tray with said sheet; a switch actuated by said carriage when same is located in a predetermined position with respect to said punch means, said switch controlling said actuating means.

4. A machine for punching out areas of a sheet and depositing same in a predetermined pattern on a tray, including in combination: punch means; actuating means for moving said punch means through a punching stroke; a carriage positioned below said punch means and being movable in a substantially horizontal direction beneath said punch means and transverse to the direction of movement thereof during a punching stroke; sheet supporting means supported on the upper portion of said carriage for movement therewith; a tray supported on the lower portion of said carriage beneath said sheet supporting means for movement simultaneously therewith so that as said carriage moves and said punch means are repetitively moved through punching strokes, punched out areas of said sheet will be deposited in a predetermined pattern on said tray.

5. A machine according to claim 4 wherein at least one side of said carriage is open so that the tray can be removed therefrom by a sidewise movement with respect thereto.

6. A machine for punching out areas of a sheet and depositing same in a predetermined pattern on a tray, including in combination: a plurality of vertically movable punches; means for moving said punches vertically through a punching stroke; a guide block and a guide plate spaced vertically from each other and located below said punches; a carriage positioned below said punches and means supporting same for movement in a substantially horizontal direction beneath said punches, said carriage including sheet supporting means movable therewith horizontally through the space between said guide plate and guide block, said sheet supporting means permitting movement of said punches therethrough and through said sheet so that areas of said sheet are punched out and drop downwardly therefrom; a tray supported on and for movement with said carriage and located below said guide plate and guide block for receiving areas of a sheet punched out by said punches.

7. A machine according to claim 6 wherein said carriage includes a wheel supported frame having a pair of upstanding end members, one of which is located on one side of said guide plate and guide block and the other of which is located on the other side thereof, said sheet supporting means resting on and extending between said end members.

8. A machine according to claim 7 wherein said sheet supporting means includes a pair of plates hingedly connected along one edge thereof, said plates having aligned openings therethrough through which said punches are receivable.

9. A machine for punching out areas of a sheet impregnated with a fermentation product of micro-organisms and depositing same in a predetermined pattern on a tray containing a culture medium, including in combination: a substantially horizontal, elongated frame; a vertically disposed fluid pressure operated cylinder mounted above said frame and having a piston slidable therewithin, a plurality of punches connected to said piston for being reciprocated vertically through a punching stroke thereby; a pair of transversely spaced mounting means extending upwardly from the sides of said frame; a guide block and a guide plate supported on and extending between said mounting means, said guide block and guide plate being spaced vertically from each other and being located below said punches, said guide plate and guide block having aligned openings for receiving said punches therethrough during a punching stroke thereof; a wheel supported carriage and means on said frame supporting said carriage for horizontal rolling movement beneath said punches, said carriage having a pair of upstanding end members located respectively on either longitudinal side of said guide block and guide plate; a sheet supporting means resting on and extending between said end members and extending through the space between said guide plate and guide block, said sheet supporting means including a pair of plates hinged along one longitudinal edge thereof between which a sheet may be placed, said plates having aligned openings through which said punches are movable to punch out areas of the sheet; said upstanding end members having shoulders thereon in the lower portions thereof; a tray supported on said shoulders for movement with said carriage, said tray being located below said plates so that punched out areas of said sheet may fall thereonto, said tray being removable from said carriage by sidewise movement thereof; and detent means for releasably holding said carriage in a plurality of positions with respect to said punches.

10. A machine according to claim 9 wherein the upper plate of said sheet supporting means is shorter than the lower plate so that said upper plate may be pivoted upwardly without hindrance from said guide plate or guide block when said carriage is at one end of its travel with respect to said punches.

References Cited in the file of this patent

UNITED STATES PATENTS

| | | |
|---|---|---|
| 122,602 | Gunther | Jan. 9, 1872 |
| 823,148 | Weatherson | June 12, 1906 |
| 1,447,381 | Graham | Mar. 6, 1923 |
| 1,625,215 | Lacke | Apr. 19, 1927 |
| 1,780,680 | Kay | Nov. 4, 1930 |
| 1,885,169 | Altvater | Nov. 1, 1932 |
| 2,201,582 | Jerichow | May 21, 1940 |
| 2,377,262 | O'Leary | May 29, 1945 |
| 2,431,528 | Wells et al. | Nov. 25, 1947 |
| 2,666,018 | Rowland et al. | Jan. 12, 1954 |
| 2,674,311 | Griswold | Apr. 6, 1954 |
| 2,708,178 | Gyorgy | May 10, 1955 |
| 2,787,581 | Scherr | Apr. 2, 1957 |
| 2,912,042 | Jenkins | Nov. 10, 1959 |